March 24, 1964　　　I. RINKEWICH　　　3,126,156
TRAVELLING SPRINKLER
Filed Nov. 28, 1961　　　6 Sheets-Sheet 1

INVENTOR.
ISAAC RINKEWICH
BY
James and Franklin
ATTORNEYS

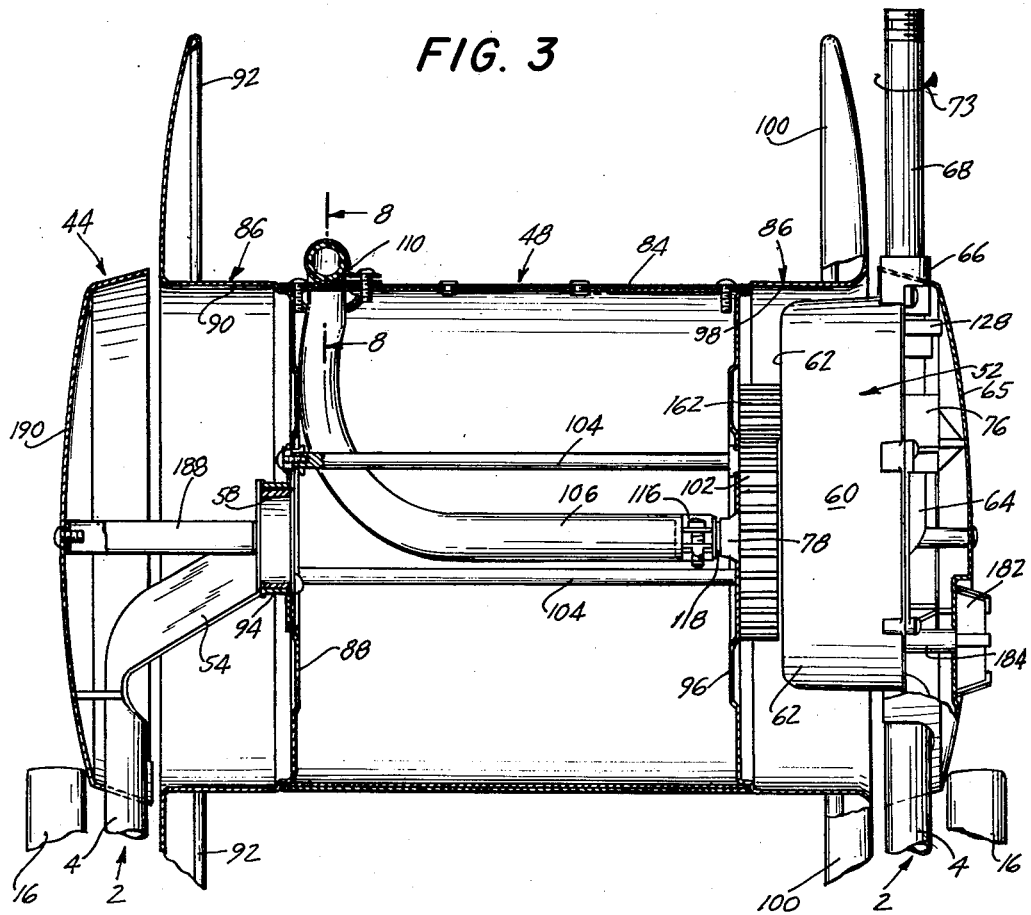
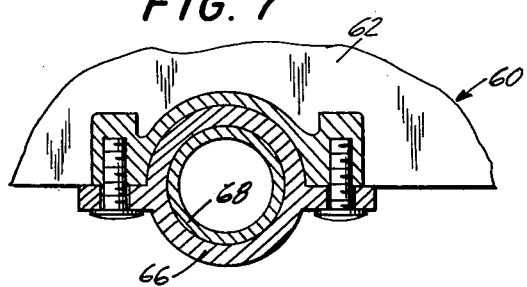

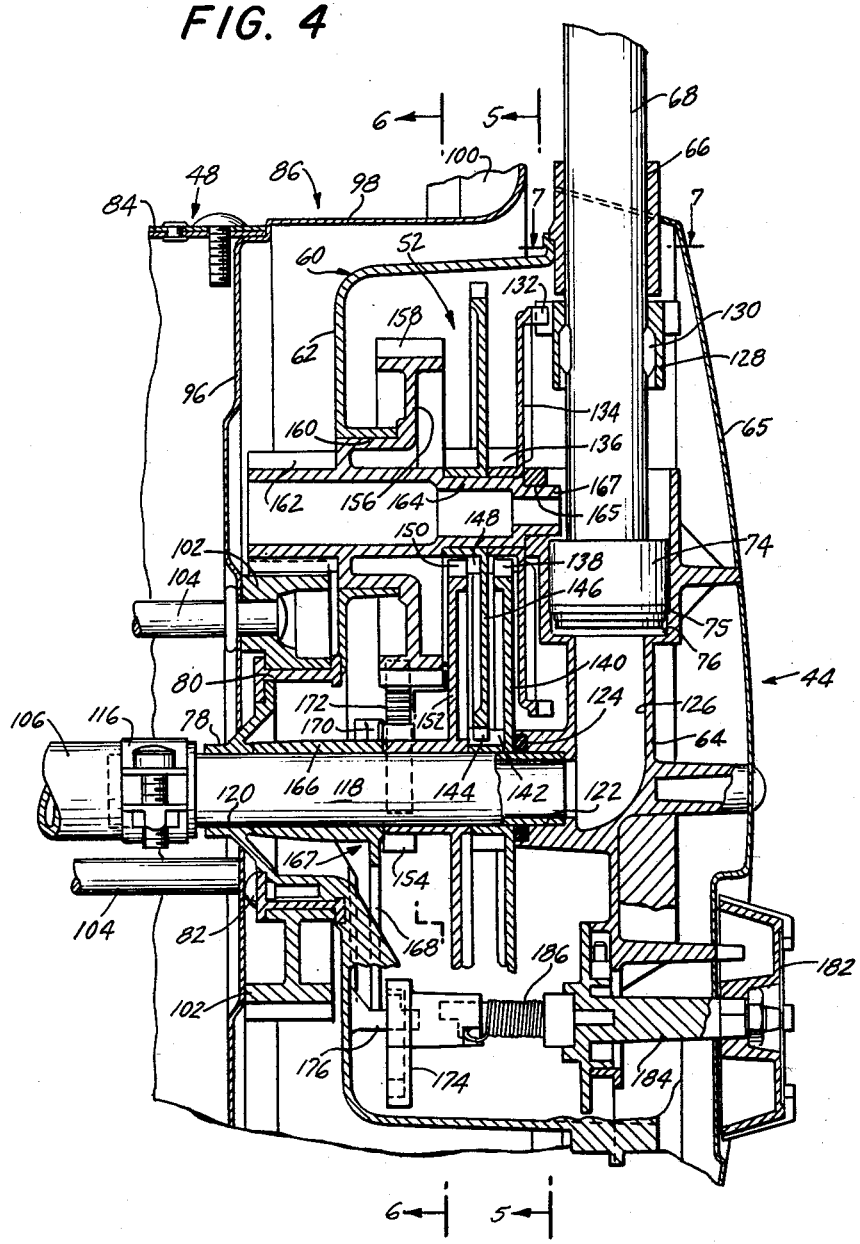

March 24, 1964     I. RINKEWICH     3,126,156
TRAVELLING SPRINKLER
Filed Nov. 28, 1961     6 Sheets-Sheet 4

INVENTOR.
ISAAC RINKEWICH
BY
*James and Franklin*
ATTORNEYS

March 24, 1964     I. RINKEWICH     3,126,156

TRAVELLING SPRINKLER

Filed Nov. 28, 1961     6 Sheets-Sheet 5

INVENTOR.
ISAAC RINKEWICH
BY *James and Franklin*
ATTORNEYS

March 24, 1964     I. RINKEWICH     3,126,156
TRAVELLING SPRINKLER
Filed Nov. 28, 1961     6 Sheets-Sheet 6

INVENTOR.
ISAAC RINKEWICH
BY James and Franklin
ATTORNEYS

United States Patent Office 3,126,156
Patented Mar. 24, 1964

3,126,156
TRAVELLING SPRINKLER
Isaac Rinkewich, Hasbrouck Heights, N.J., assignor to International Patent Research Corp., New York, N.Y., a corporation of New York
Filed Nov. 28, 1961, Ser. No. 155,352
10 Claims. (Cl. 239—183)

The present invention relates to the construction of a travelling sprinkler adapted to wind an elongated element upon itself and to follow the path of that elongated element as it extends over the ground.

Sprinklers of this type are in demand for the watering of areas so extensive that the use of a single fixed sprinkler is not practical, such as golf courses, park areas and very large lawns. It is desired that means be provided to cause the sprinkler, automatically and without requiring manual supervision, to follow a predetermined path over the ground while it is sprinkling, thus producing a substantially uniform distribution of water over the wide area desired. To accomplish this result a flexible elongated element is extended over the ground along the path which the sprinkler is to travel, and the sprinkler winds that elongated element upon a reel which it carries, thus pulling itself along the path of the elongated element. The elongated element could take any form, but since water must be supplied to the sprinkler throughout its operation, it is usually preferred that the elongated element be defined by the same flexible hose which brings water to the sprinkler, the winding up of that hose upon the sprinkler reel being accomplished in such a manner as not to interfere with the flow of liquid therethrough. The specific embodiment of the present invention here disclosed is of such a character, but it will be appreciated as will become apparent hereinafter, that many aspects of the structure of the present invention are of utility even when a different type of elongated element is employed.

The construction here disclosed presents many advantages over prior art constructions of the same general type. In the first place, the parts are so arranged as to permit the sprinkler of the present invention to be used with a high degee of reliability on rough, uneven and hilly terrain, the arrangement of parts being such as to minimize the possibility that the device might tip over when negotiating a steep incline. In the second place, the device is so designed that it can readily be converted for use as a stationary sprinkler when desired, thus greatly increasing its adaptability. Further, the parts are so arranged that the sprinkler may very readily be moved from one position to another, all without detracting from its ability, when so desired, to reliably follow the path of the elongated member with which it is adapted to cooperate even though that path may be very sinuous. Moreover, the design is such that a sturdy, reliable, and positively acting assembly is produced from simple and easily assembled parts, thereby making for relative inexpensiveness with no loss in function.

More specifically, the travelling sprinkler of the present invention comprises an elongated supporting framework having wheels at one end for supporting the sprinkler and causing it to move readily over the ground. The supporting frame is provided, adjacent its other end, with an externally recessed depending part such as a rotatable pulley, that part being adapted to receive the elongated element within its external recess, thereby to guide the sprinkler along the path of that elongated element. A portion of the supporting frame extends forwardly from this depending part, thereby to function as a handle by means of which the device may be manipulated and moved, the externally recessed depending part being readily disengaged from and engaged with the elongated element, thus facilitating manipulation and movement of the sprinkler. The supporting frame carries the sprinkling and moving mechanism at a point located between the wheels and the depending part which engages the elongated element, the weight of the sprinkling and moving mechanism thus being so positioned as to impart a high degree of stability to the sprinkler, permitting it to negotiate steep inclines without tipping.

The sprinkling and moving mechanism comprises a fluid-driven rotating sprinkler, a reel on which the elongated element is adapted to be wound, and motive means for driving the reel. The motive means is adapted to be energized by the flow of fluid through the sprinkler and, in the form here specifically disclosed, by the fluid-flow-produced rotation of the sprinkler itself. The motive means is provided with a manual control for selectively rendering it operable and inoperable, thereby causing the sprinkler respectively to wind the elongated element upon itself as it sprinkles, thereby to move along the path of that elongated element, or to sprinkle without winding, thereby remaining stationary. When, as is here specifically disclosed, the elongated element is in the form of a hose which supplies fluid to the sprinkler, the reel is provided with a fluid connection adapted to extend between the end of the hose and the sprinkler nozzle, a portion of that fluid connection rotating with the reel. The reel is in the form of a drum which adds rigidity to the overall structure, that drum carrying a fixed gear at one end thereof, the device including a fixed assembly mounted beyond said end of the drum, said end preferably being recessed and said fixed assembly being at least partially received therewithin, that fixed assembly including a gear driven by the motive means and drivingly engaging the gear fixed to the drum. The fixed structure may further include a guide on which the drum-carrier gear slides, thereby assisting in rotatively supporting the drum.

To the accomplishment of the above, and to such other objects as may hereinafter appear, the present invention relates to the construction of a travelling sprinkler, as defined in the appended claims, and as described in this specification, taken together with the accompanying drawings in which:

FIG. 3 is a cross sectional view of the winding and sprinkling mechanism, the gear box housing being shown in elevation;

FIG. 4 is a fragmentary cross sectional view, on an enlarged scale, of the right-hand portion of the assembly shown in FIG. 3, the gear box housing being cross sectioned;

Figure 5:
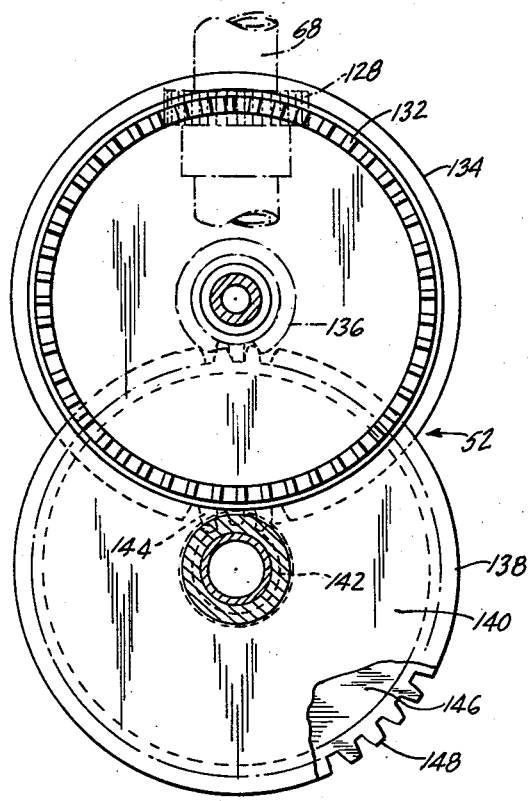
Figure 6:
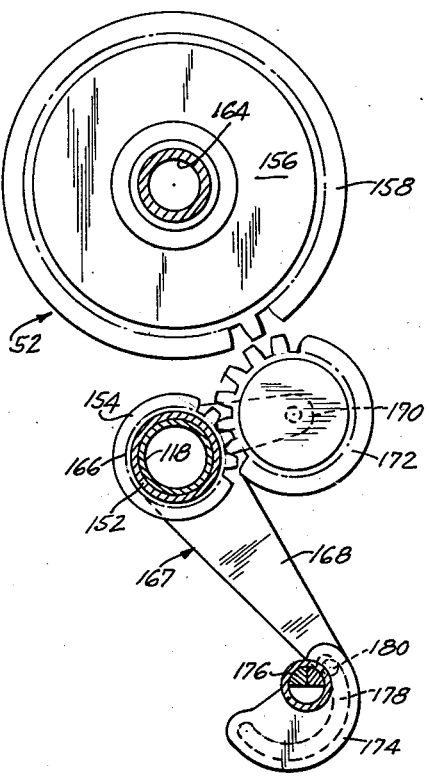
Figure 8:
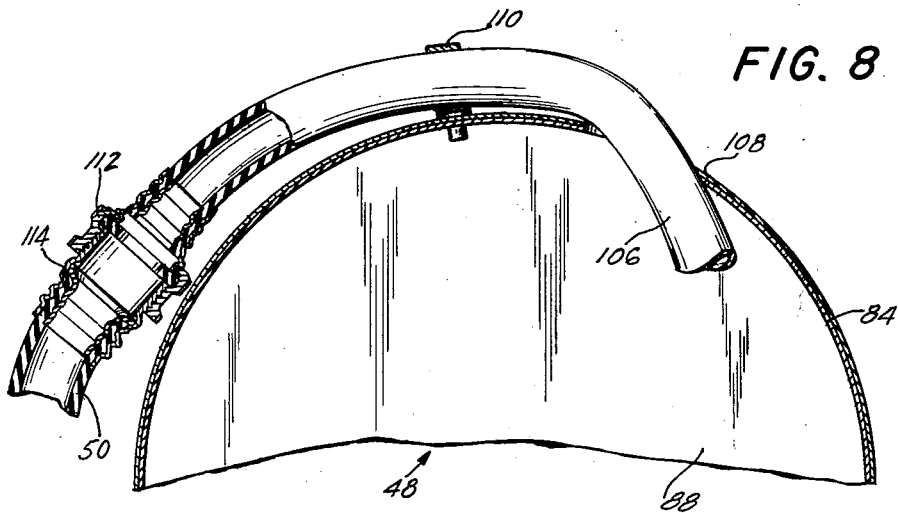
Figure 9:
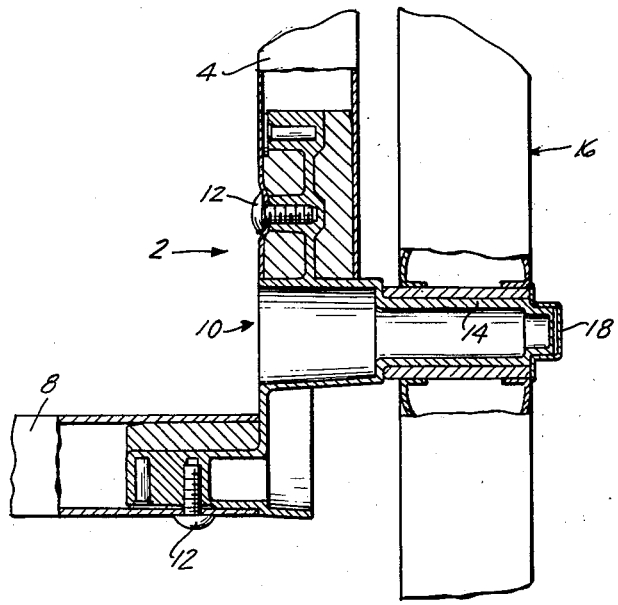
Figure 10:
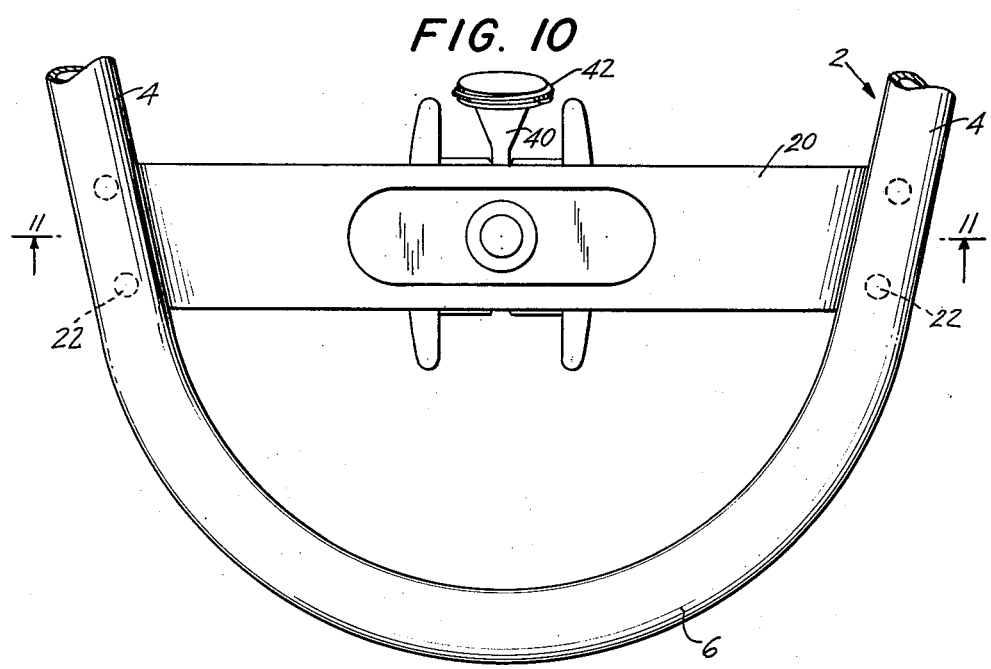
Figure 11:
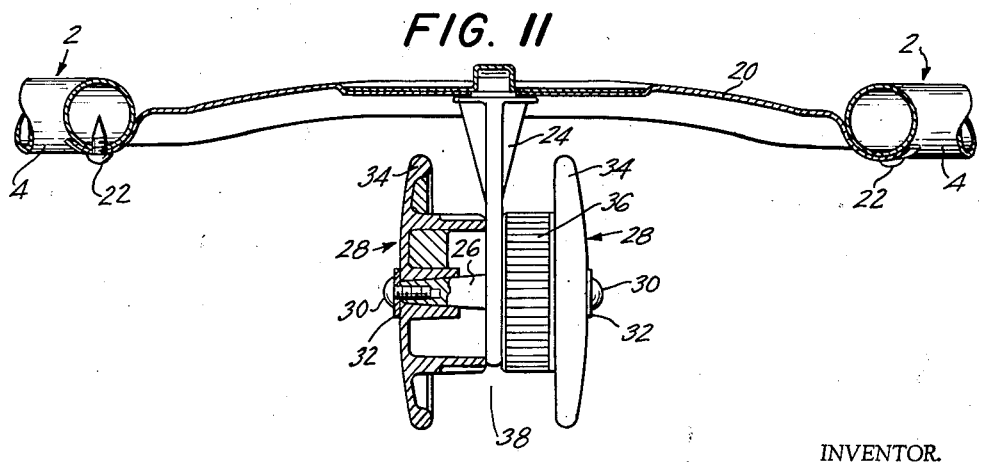

FIGS. 5, 6 and 7 are cross sectional views taken along the lines 5—5, 6—6 and 7—7 respectively of FIG. 4;

FIG. 8 is a fragmentary cross sectional view taken along the line 8—8 of FIG. 3;

FIG. 9 is a horizontal cross sectional view showing the manner in which the wheels are mounted at one end of the supporting frame;

FIG. 10 is a fragmentary top plan view of the forward end of the supporting frame; and FIG. 11 is a cross sectional view taken along the line 11—11 of FIG. 10.

The travelling sprinkler as here disclosed comprises an elongated supporting frame generally designated 2, and comprising side arms 4 integrally connected at their forward end by a part 6 and connected at their rear ends by a cross arm 8. As may be seen from FIG. 9, brackets generally designated 10 are secured between the cross bar 8 and the rear ends of the side arms 4, as by screws 12, those brackets 10 having outwardly extending axial portions 14 on which the wheels 16 are rotatively mounted, held in place by hub caps 18. As may best be seen from FIGS. 10 and 11, a plate 20 extends between the side arms 4 adjacent their forward end, being held in place by screws 22, and a bracket 24 depends from the plate 20 and has laterally extending axle portions 26 on which rotatable elements 28 are mounted and secured in place by screws 30 and washers 32, those rotatable elements having flanges 34, the radial outer surfaces of their bodies being corrugated or knurled at 36 for better gripping, the elements 28 collectively thus defining what may be considered a pulley having an externally recessed portion 38 between the flanges 34. Extending rearwardly from the bracket 24 is a projecting part 40 having at its end an externally threaded portion 42.

Figure 1:
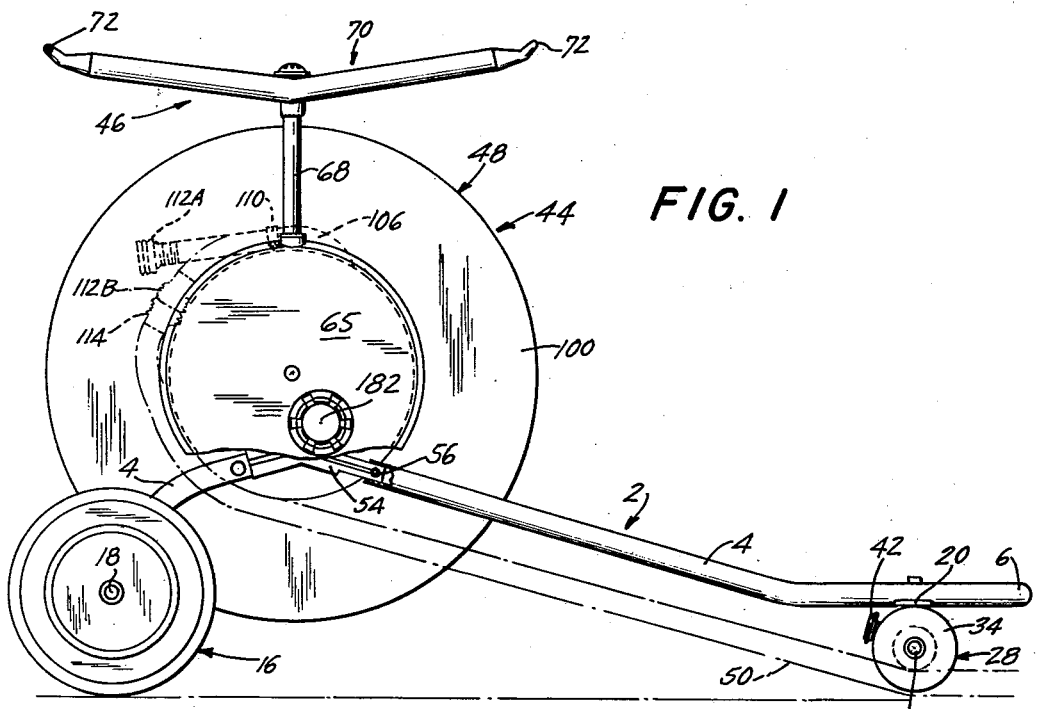
FIG. 1 is a side elevational view, partially broken away, of the preferred embodiment of the present invention.
Figure 2:
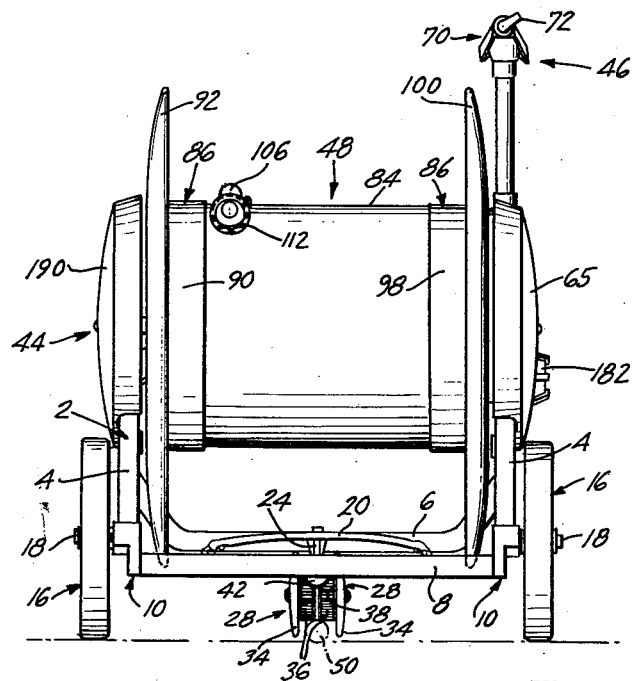
FIG. 2 is an end elevational view thereof, taken from the left-hand end of FIG. 1.

As may be seen from FIG. 1, the frame 2 is adapted to be supported by the wheels 16 and the elements 28. The side arms 4 of that frame extend upwardly from the points where they are connected to the wheels 16 and the elements 28 respectievly and, at or near their high point, the operative assembly of the sprinkler, generally designated 44, is mounted. That operative assembly 44 comprises the sprinkler proper, generally designated 46, the reel generally designated 48 on which an elongated element 50 is adapted to be wound, and motive means, generally designated 52, for driving the reel 48 in rotation.

As may best be seen from FIGS. 1 and 3, the side arms 4 are formed of forward and rear sections connected to one another by brackets 54 secured in place by screws or the like 56. On the left-hand side in FIG. 3 the bracket 54 carries a fixed central support 58. On the right-hand side the bracket 54 carries a gear box housing 60, some of the details of which are shown in FIG. 4. That housing comprises an inner wall 62 and an outer wall 64, with an ornamental cover 65 thereover. The upper end of the housing is provided with a bushing 66 through which the pipe 68 of the sprinkler unit 46 rotatably passes, the upper end of that pipe 68 carrying the nozzle assembly 70, which includes angularly oriented nozzle tips 72, thereby, by means of the well known reaction effect, causing the nozzle assembly 70 and the pipe 68 to rotate, as indicated by the arrow 73 in FIG. 3, when liquid escapes from the nozzle tips 72. The pipe 68 is provided at its lower end with a bearing bushing 74 and a sealing ring 75 rotatably received within socket 76 formed inside the housing 60.

The inner end of the housing 60 is provided with a fixed inwardly projecting portion 78 to which a circular flanged guide 80 is secured, as by screws 82. The reel 48 is rotatably mounted on the guide 80 at one end, and on the part 58 at its other end. That reel comprises a hollow drum-like body having an outer wall 84 connected in any appropriate manner to end members generally designated 86. The left-hand member, as viewed in FIG. 3, comprises an end wall 88, a horizontal wall 90 which forms an extension of the wall 84, and an outwardly extending flange 92. The end wall 88 is provided with a hub portion 94 rotatably mounted on the part 58. The right-hand member 86 comprises an end wall 96, a horizontal wall 98 and a flange 100, and external ring gear 102 is secured to the outside of the end wall 96, that gear being received within and rotatably supported and guided by the fixed flanged guiding member 80 on the housing 60. Cross rods 104 may extend through the reel 48 to connect the opposing end walls 88 and 96 to one another, thereby rigidifying the reel 48, ends of those cross rods 104 also serving to secure the gear 102 in place, as may be seen in FIG. 4.

Where, as is here specifically disclosed, the elongated element 50 is constituted by a liquid-conducting hose adapted to supply liquid to the nozzle assembly 70, the reel 48 is provided with a fluid conduit which (see FIG. 8) passes through an opening 108 in the drum wall 84, its outer portion being secured to the drum wall 84 by clamp 110, extending from that clamp, and terminating in a sparable connector 112, to which the end 114 of the elongated hose element 50 is adapted to be secured. The other end of the conduit 106, inside the drum 48, is rigidly connected, as by clamp 116, to a pipe 118 which extends through outwardly opening passage 120 of the housing 60 and into socket 122 in the interior of the housing 60, there being sealingly engaged by sealing ring 124. The pipe 118 is rotatable within the opening 120 and the socket 122 and communicates with internal passage 126, which in turn communicates with the socket 76 in which the lower open end of the pipe 68 is received. Normally, when the outer end of the conduit 106 is unsecured to the hose 50, the conduit 106 will assume a relatively upstanding position indicated in FIG. 1 at 112A. When it is connected to the end 114 of the hose 50 it will bend to be pulled down against the reel wall 84, as shown in FIG. 8 and as indicated at 112B in FIG. 1. A fluid flow path is therefore defined through the hose 50, the conduit 106, the pipe 118, the passage 126, and the pipe 68 to the nozzle assembly 70, the fluid flowing through that path emerging in the form of jets from the nozzle tips 72, thus causing the nozzle assembly 70 and the pipe 68 to rotate.

The motive means for causing the reel 48 to rotate is best shown in FIGS. 3–6. A gear 128 is fixed to the pipe 68 as by keying 130. This gear meshes with the outer teeth 132 on gear 134, the inner teeth 136 thereof meshing with the outer teeth 138 of gear 140. The inner teeth 142 of gear 140 mesh with the outer teeth 144 of gear 146, the inner teeth 148 of which mesh with outer teeth 150 of gear 152, that gear 52 having inner teeth 154 which rotate therewith. A gear 156 has outer teeth 158 adapted to be driven indirectly by the gear teeth 154 in a manner to be described hereinafter, the gear 156 being rotatably mounted in aperture 160 formed in the inner end of the housing wall 62 and, outside the housing 60, having external gear teeth 162 which mesh with gear 102 fixed to the reel 48. The gears 134 and 146 are independently rotatably mounted on projecting part 164 of gear 156, which is in turn journalled at 165 in the outer housing wall 64, and the gears 140 and 152 are independently rotatably mounted on pipe 118. An inwardly projecting portion 167 of the part 164 extends over the bearing bushing 74 on the pipe 68, retaining the bushing 74 in the socket 76.

The mechanical driving connection between the gear teeth 154 of gear 152 and the gear teeth 158 of gear 156 is best shown in FIG. 6. Rotatably mounted on pipe 118 by means of hub 166 is a crank 167 having a depending arm 168 and a laterally extending arm 170. Rotatably mounted on the laterally extending arm 170 is an idler gear 172 which is always in mesh with the gear 154 and which, depending upon the position of the crank 167, is either in engagement with the gear teeth 158 on gear 156 or out of engagement therefrom, the idler gear 172 being shown in FIG. 6 in its disengaged position. The crank 167 is adapted to be actuated by means of cam 174 rotatably mounted within the housing 60 at 176, that cam 174 having an eccentric cam groove 178 within which is received pin 180 secured to the end of crank arm 168. The cam 174 is adapted to be rotated by means of knob 182 mounted on the outside of the wall 65, that knob, when manipulated, rotating shaft 184. The shaft 184 is operatively connected to the cam 174 by positive drive and by means of torsion spring 186, the connection being such that there is rotative lost motion between the shaft 184 and the cam 174 which is normally taken up by the spring 186. The purpose of this resilient lost motion connection is to permit the knob 182 to be manually moved to a position corresponding to engagement between the gear teeth 172 and 158 even though those teeth may at a given moment be in a relative rotative position preventing meshing. In such an event the spring 186 will yield, but will urge gear teeth 172 against gear teeth 158, the two sets of gear teeth snapping into operative engagement when they have rotated sufficiently to permit that action.

It will be noted that the right-hand end piece 86 of the reel 48 produces a recessed end structure for that reel, into which recess the fixed housing 60 extends, thus making for compactness and hiding from view, and protecting from deleterious external influences, the operative parts of the sprinkler. The left-hand bracket 54 carries an outwardly extending rod 188 on which is mounted a cover plate 190 which masks the left-hand recessed end of the reel 48 and which matches in appearance the exposed wall 65 covering the housing 60.

The manner of functioning of the sprinkler will, it is felt, be apparent from the above description. The hose 50 is laid out along the ground in accordance with the path which it is desired that the sprinkler take, and its end 114 is connected to the end 112 of the conduit 106 on the reel 48. When the water is turned on the sprinkler unit 70 will rotate and that rotation will be transmitted to the reduction gearing 132–154 by the gear 128. When the knob 182 is located in its "travel" position, in which it causes the gears teeth 182 and 158 to mesh, this rotation will be transmitted to the gear 162, thus causing the gear 102 to rotate, this in turn rotating the reel 48 and causing the hose 50 to wind up thereon. The sprinkler will thus pull itself along the length of the hose 50, being guided to move in the proper direction by the engagement of that hose 50 in the outwardly opening recess 38 between the rotatable elements 28 at the forward end of the sprinkler. If it is desired that the sprinkler should remain stationary at any point or at any time, the operator need merely rotate the knob 182 to its "idle" position, disengaging the gear teeth 172 from the gear teeth 158. The nozzle assembly 70 will continue to rotate, but the reel 48 will no longer be driven in rotation, and hence the sprinkler will no longer move over the ground.

As will be seen particularly from FIG. 1, the location of the weighted parts of the unit relative to the wheels 16 and the depending elements 28 imparts a high degree of stability to the device. The location of those weighted elements tends to urge the parts 28 down against the hose 50, thus preventing accidental disengagement thereof. Moreover, this hose-engaging force will continue to be exerted even if the sprinkler is negotiating a steep upward incline, this by virtue of the fact that the weighted elements are located appreciably forwardly of the axis of rotation of the wheels 16. However, if it is desired to disengage the elements 28 from the hose 50, as when the sprinkler is to be moved to a new location, all that one need do is grasp the forwardly extending portion 6 of the supporting frame, which functions as a handle, and lift it. The element 28 will readily disengage from the hose 50, the active force of the weighted elements will move rearwardly until it is approximately over the axis of the wheels 16, and the sprinkler may readily be rolled from one position to another with very little exertion being required.

The part 42 is designed to be used when the sprinkler is to be stored with the hose 50 wound up on the reel 48, the extending end of the hose 50 being securable to the externally threaded portion 42 of the part 40 at that time. The device may then be manually moved from position to position with its supply of hose 50 in position thereon.

The disclosed structure will, it will be seen, function in a highly reliable manner either as a stationary sprinkler or a travelling sprinkler, at the will of the operator. When functioning as a travelling sprinkler it will perform effectively and reliably even in situations of extreme difficulty, as where the path to be travelled is winding or involves the negotiation of relatively steep inclines. The parts are sturdy and dependable, need not be made to any extreme degree of precision, and are readily assembled. The arrangements of parts is compact—a not inconsiderable factor particularly when home use is involved—and attractive, with the operative parts not only hidden from view and protected against deleterious external influences, but also arranged so as to accomplish the desired results in a high efficient manner.

While but a single embodiment of the present invention has been here disclosed, it will be apparent that many variations may be made therein, all within the spirit of the invention as defined in the following claims.

I claim:

1. A travelling sprinkler comprising an elongated supporting member, ground-engaging means on said member at longitudinally spaced points thereon and supporting at least a portion of said member spaced above the ground, and an assembly comprising a nozzle, a reel on which an elongated element is adapted to be wound, and motive means operatively connected to said reel for rotating the latter, said assembly being mounted on said member, said reel having a recessed end, a gear fixed to said reel, said assembly comprising a section fixedly mounted on said supporting member independently of said ground-engaging means, a transmission mounted on said fixed section which is at least partially received in said recessed end of said reel, and an output gear driven by said transmission and drivingly engaging said gear fixed to said reel, said motive means being drivingly operatively connected to said transmission.

2. In the sprinkler of claim 1, manually actuated means carried by said assembly and exposed at the side thereof, said means being operatively connected to said transmission and operative to selectively connect and disconnect said motive means and said reel.

3. A travelling sprinkler comprising an elongated supporting member, ground-engaging means on said member at longitudinally spaced points thereon and supporting at least a portion of said member spaced above the ground, and an assembly comprising a nozzle, a reel on which an elongated element is adapted to be wound, and motive means operatively connected to said reel for rotating the latter, said assembly being mounted on said member, said reel having a recessed end, a gear fixed to said reel, said assembly comprising a section fixedly mounted on said supporting member independently of said ground-engaging means, a transmission mounted on said fixed section which is at least partially received in said recessed end of said reel, and an output gear driven by said transmission and drivingly engaging said gear fixed to said reel, said motive means being drivingly operatively connected to said transmission, said fixedly mounted section of said assembly including a guide on which said gear fixed to said reel slides, thereby to assist in rotatively supporting said reel.

4. In the sprinkler of claim 3, manually actuated means carried by said assembly and exposed at the side thereof, said means being operatively connected to said transmission and operative to selectively connect and disconnect said motive means and said reel.

5. A travelling sprinkler comprising a ground-engaging supporting frame, wheels, means mounting said wheels on said frame to rotate about an axis, an assembly mounted on said frame and comprising a relatively fixed section extending laterally across said frame, a reel rotatably mounted on said fixed section on which an elongated element is adapted to be wound, a rotatable nozzle mounted on said fixed section, means for feeding fluid to and out of said nozzle, motive means actuated by said fed fluid and operatively connected to said reel for rotating the latter, and manually actuated means operatively connected between said motive means and said reel for selectively connecting and disconnecting them, said manually actuated means comprising a pair of gears and means for moving said gears between engaged and disengaged positions, said moving means including a lost motion linkage resiliently urged to gear-engaging condition.

6. The travelling sprinkler of claim 5, in which said motive means comprises a gear fixed to one side of said reel and a gear cooperating therewith and mounted on said fixed section, and a guide on said fixed section on which said gear fixed to said reel slides, thereby to assist in rotatively supporting said reel.

7. A travelling sprinkler comprising a forwardly extending elongated supporting member, ground-engaging means on said member at longitudinally spaced points thereon, a reel provided with flanges on which an elongated element is adapted to be wound, said reel being rotatably mounted on said supporting member, a nozzle carrying assembly fixedly mounted on said supporting member on one side of said reel, motive means forming a part of said assembly, mounted at said side of the reel, extending into said side of the reel, and operatively connected to said reel for rotating the latter, said assembly also including a cover plate fixed to the assembly for covering said motive means and said side of the reel, a cover plate fixedly mounted on said supporting member at the other side of said reel and opposite said assembly for covering the other side of said reel, the said cover plates having substantially the same vertical areal extent, which is less than and a substantial fraction of the vertical areal extent of said reel and its flanges.

8. The travelling sprinkler of claim 7, in which the sides of said reel are recessed, the reel-side-obscuring portions of said assembly and said structural element being opposite said recessed parts of said sides, said assembly extending into the recessed part which it is opposite, and said reel-side-obscuring portions of said assembly and said structural element being of a size such as to obscure said recessed parts of said sides from view.

9. In the travelling sprinkler of claim 7, a manually actuatable element carried by said assembly and mounted on the exterior of said first mentioned cover plate, and means operatively connecting the said manually actuatable element between the said motive means and the said reel for selectively connecting and disconnecting them.

10. The travelling sprinkler of claim 7, in which the sides of said reel are recessed, and in which the said cover plates are opposite said recessed parts of said sides.

References Cited in the file of this patent

UNITED STATES PATENTS

| | | |
|---|---|---|
| 1,919,703 | Nielsen | July 25, 1933 |
| 2,256,838 | Adamson | Sept. 23, 1941 |
| 2,540,556 | Salatin | Feb. 6, 1951 |
| 2,602,696 | Salatin | July 8, 1952 |
| 2,683,056 | Hilfinger | July 6, 1954 |

FOREIGN PATENTS

| | | |
|---|---|---|
| 109,119 | Australia | Nov. 15, 1939 |